United States Patent Office 2,860,951
Patented Nov. 18, 1958

2,860,951

RECOVERY OF VALUES IN NATURALLY OCCURRING ALKALI METAL SULFATE MINERALS

George L. Cunningham, Cleveland Heights, Ohio, assignor to Horizons Incorporated No Drawing. Application July 28, 1955
Serial No. 525,084

10 Claims. (Cl. 23—32)

This invention relates to a new and novel process for the recovery of the alkali metal values in artificial or naturally occurring complex sulfates of alkali metals and one or more other metals, including calcium, magnesium, copper, manganese, lead, and aluminum. More particularly it relates to a process in which the sulfate containing material is sintered or fused with a proportioned amount of acid oxide such as silica sand under conditions which insure the conversion of the other metal content of the charge material from the sulfate to the silicate without any appreciable accompanying conversion of the alkali metal sulfate content of the charge material.

Typical minerals which are amenable to the process constituting my invention include the following natural or artificial ores:

| Name | Formula |
|---|---|
| Palmierite | $(K,Na)_2SO_4 \cdot PbSO_4$ |
| Vanthoffite | $3Na_2SO_4 \cdot MgSO_4$ |
| Glauberite | $Na_2SO_4 \cdot CaSO_4$ |
| Langbeinite | $K_2SO_4 \cdot 2MgSO_4$ |
| Manganolangbeinite | $K_2SO_4 \cdot 2MnSO_4$ |
| Syngenite | $K_2SO_4 \cdot CaSO_4 \cdot H_2O$ |
| Kroehnkite | $Na_2SO_4 \cdot CuSO_4 \cdot 2H_2O$ |
| Loewite | $Na_2SO_4 \cdot MgSO_4 \cdot 2\frac{1}{2}H_2O$ |
| Bloedite | $Na_2SO_4 \cdot MgSO_4 \cdot 4H_2O$ |
| Wattevilleite | $Na_2SO_4 \cdot CaSO_4 \cdot 4H_2O$ |
| Leonite | $K_2SO_4 \cdot MgSO_4 \cdot 4H_2O$ |
| Picromerite | $K_2SO_4 \cdot MgSO_4 \cdot 6H_2O$ |
| Cyanochroite | $K_2SO_4 \cdot CuSO_4 \cdot 6H_2O$ |
| Polyhalite | $K_2SO_4 \cdot 2CaSO_4 \cdot MgSO_4 \cdot 2H_2O$ |
| Leightonite | $K_2SO_4 \cdot 2CaSO_4 \cdot CuSO_4 \cdot 2H_2O$ |
| Tamarugite | $Na_2SO_4 \cdot Al_2(SO_4)_3 \cdot 12H_2O$ |
| Mendozite | $Na_2SO_4 \cdot Al_2(SO_4)_3 \cdot 22H_2O$ |
| Kalinite | $K_2SO_4 \cdot Al_2(SO_4)_3 \cdot 22H_2O$ |
| Potassium Alum | $K_2SO_4 \cdot Al_2(SO_4)_3 \cdot 24H_2O$ |
| Sodium Alum | $Na_2SO_4 \cdot Al_2(SO_4)_3 \cdot 24H_2O$ |
| Alunite | $K_2SO_4 \cdot 3Al_2(SO_4)_3(OH)_4$ |
| Natroalunite | $Na_2SO_4 \cdot 3Al_2(SO_4)_3(OH)_4$ |
| Natrochalcite | $Na_2SO_4 \cdot 3CuSO_4 \cdot Cu(OH)_2 \cdot H_2O$ | and others of even greater complexity. Because there are extensive deposits of polyhalite in the United States and other parts of the world, and because the procedures are typical, this specification will describe the treatment of polyhalite, it being understood that the techniques disclosed are equally applicable to the processing of many other naturally occurring ores or artificially produced sulfate containing minerals, such as those listed above.

Numerous efforts have been made to devise and to develop processes for the recovery of potassium sulfate and other salts from polyhalite, but until the present time no method has been successfully commercially exploited. The Bureau of Mines of the United States Department of the Interior has carried out extensive investigations on the recovery of various potassium salts from polyhalite and has published a comprehensive report on the subject in Bulletin 459. Three general lines of investigation are discussed in the report as follows: (1) solution processes employing no added chemicals other than water and possibly heat (2) reduction of the sulfates to sulfides or oxides prior to solution processes and (3) decomposition by chemical reaction with various reagents such as lime, carbon dioxide or ammonia. Each of these lines of attack has proven to be technologically or economically unattractive.

My invention comprises a combination of the first and last of these approaches. Polyhalite deposits are found at depths ranging from 700 to 2000 feet and are often interspersed with intrusions of halite (NaCl) and anhydrite ($CaSO_4$). Polyhalite as mined in many instances contains as much as 13% sodium chloride, the removal of which is generally effected prior to any other treatment of the ore in order to improve the recovery of potassium salts in the subsequent steps. The process variables to be considered in removal of the sodium chloride are discussed in detail in the aforesaid Bureau of Mines Bulletin. I have found that by rapid washing of the ore with limited amounts of water at room temperature, over 95% of the sodium chloride may be removed with an accompanying loss of less than about 3% of the potassium sulfate. Leaching with water at higher temperatures on the order of 100° C. has been found to be unsuitable because of the large amount of potassium sulfate lost in the extraction liquid.

After the sodium chloride has been removed by rapid washing, the polyhalite is heated with an acidic oxide, preferably silica ($SiO_2$) to a temperature between about 500° C. and 1500° C. or even higher. As a result, the alkaline earth sulfates are converted to alkaline earth silicates and sulfur dioxide is evolved from the heated mass.

By varying the ratio of silica to polyhalite used in the sintering or fusion operation, more or less of the alkaline earth content of the polyhalite is converted to the corresponding silicate. It is preferred to use an amount of silica which is exactly stoichiometrically equal to the amount required to react with the alkaline earth sulfates, i. e. the calcium sulfate and magnesium sulfate, in the polyhalite. When the amount of silica used is in excess of the stoichiometric amount required to react with the calcium sulfate and magnesium sulfate in the polyhalite, then small amounts of potassium silicate may be formed by reaction with the excess. When the amount of silica used is less than the amount required to react with both the calcium sulfate and the magnesium sulfate, it has been found that the silica preferentially reacts with the magnesium sulfate, leaving some or all of the calcium sulfate in the polyhalite unreacted.

In order to obtain rapid reaction between the silica and the polyhalite, I have found it advantageous to grind the sand and polyhalite prior to mixing the two ingredients. The reactants need not be dried since the presence of small amounts of water vapor has been found to be beneficial in the conversion of sulfate to silicate.

The silica used in the process need not be of high purity and ordinary sand has been found to be very suitable. However, if the calcium silicate and magnesium silicate are to be sold as white pigments or fillers, the sand used should be relatively low in iron and other impurities.

Whatever the ratio of silica to polyhalite, the product of the sintering or fusion operation is next preferably leached with hot water. By extracting the residue from the sintering operation with limited amounts of hot water it is possible to obtain solutions which are substantially saturated with respect to potassium sulfate. Depending on the ratio of silica to polyhalite, the extracts may also contain unreacted alkaline earth sulfates or small amounts of potassium silicate when excess silica is employed.

Although the potassium sulfate in the sintered mass has been found to be readily soluble in hot or cold water, I have found that the extraction may be effected with minimal amounts of water by crushing the sintered product, or by quenching the fusion product directly in water and wet grinding the frit so produced. By extracting the solid, crushed, ground or fritted residue with water at 100° C. in counter current fashion, I have produced aqueous solutions containing approximately 24.1 grams of potassium sulfate per 100 grams of water. On cooling the extract to 25° C., about one half of the potassium sulfate is precipitated as a crystalline product which is easily removed by filtration. The filtrate, or mother liquor, is reheated to 100° C. and employed to extract more potassium sulfate from the solid residue produced during the sintering or fusion step. The material remaining after repeated washings is composed almost entirely of calcium silicate and magnesium silicate. Fresh water is employed to remove the last traces of potassium or other soluble salts, the wash water being returned to the counter current extraction stage. The washed solid silicates are heated to remove water and when free of moisture form a white powdered solid suitable as an inert filler, or as a pigment, or as a corrective addition to acid soils. The following example of the process is given by way of illustration and is not to be taken as limitative thereof.

Example 1

A mixture was formed comprising 22 parts by weight of silica which has been ground to −200 mesh (Tyler Standard) and 65 parts of finely divided, −325 mesh (Tyler Standard) polyhalite. The polyhalite analyzed 12.65% potassium, by weight; 4.8% magnesium, by weight; 11.58% calcium, by weight; 60.96% sulfate, by weight; and 2.92% sodium chloride. After the two materials were intimately mixed, the mixture was sintered at temperatures between 880° C. and 950° C. for 70 minutes. When cool, the sintered mass was ball milled with approximately 200 parts by weight of water. The resulting slurry was filtered and the precipitate was washed with water. The filtrate and wash water contained 18.57 parts by weight of potassium sulfate which represented 100% yield of potassium sulfate based on the polyhalite used. The wet cake was analyzed and found to be a mixture of calcium and magnesium silicates. The evolved gases from the sintering operation contained sulfur dioxide, which was not recovered. Where the operation is conducted on a large scale, the sulfur dioxide can be recovered by any suitable apparatus and converted into sulfuric acid, sulfur, or other sulfur containing products by well known procedures.

Instead of proceeding in the manner above described, in which both the magnesium sulfate and the calcium sulfate are converted to silicates, I have found that the process may be varied in several ways without departing from the spirit or scope of my invention.

Where calcium silicate alone is desired, the process may be conducted as follows:

Example 2

The polyhalite as mined was ground as before and washed rapidly with water to effect removal of most of the sodium chloride. The washed polyhalite was calcined at about 450° C. and the calcine was treated with cold water (20° C.) to remove magnesium sulfate by dissolving same. The slurry produced was filtered to recover the magnesium sulfate in the filtrate, leaving a solid residue composed of syngenite ($K_2SO_4 \cdot CaSO_4 \cdot H_2O$) and gypsum ($CaSO_4 \cdot 2H_2O$). The solid residue was washed with an additional amount of water. The filtrate and wash water were combined and were evaporated to yield magnesium sulfate ($MgSO_4 \cdot 7H_2O$) useful as Epsom salts. The solid filter cake was ground and then mixed with sufficient finely divided silica to react with all of the calcium sulfate present. The silica and the sulfate containing material were intimately mixed and then were heated to a temperature between 500° C. and 1500° C. to convert the calcium sulfate to calcium silicate. The sintered mass was extracted with a current of hot water. The resulting aqueous solution was substantially saturated with respect to potassium sulphate which was recovered, as previously described, by cooling the solution and permitting the potassium sulfate to crystalline out. The crystals were recovered by filtration, washed clean of mother liquor and then dried. The solid residue remaining after repeated extractions with hot water was almost entirely pure calcium silicate, which when dried in useful as a pigment, filler or soil conditioner.

Example 3

The process of Example 2 was repeated except that hot water was used to extract the magnesium sulfate from the calcined polyhalite. The solid phase remaining was potassium calcium pentasulfate ($K_2SO_4 \cdot 5CaSO_4 \cdot H_2O$) instead of a mixture of syngenite and gypsum. The potassium calcium pentasulfate was crushed and then intimately mixed with sufficient silica to convert the calcium sulfate to calcium silicate. The mixture was sintered at about 900° C. for 30 minutes, after which the potassium sulfate was extracted with hot water. The residue, calcium silicate, was dried and recovered as a fine white, pigment grade powder. The potassium sulfate crystallized out of the extraction liquor when it was cooled to room temperature and was separated therefrom.

Example 4

In still another variation of my process, polyhalite was rapidly leached free of halite and then calcined. The calcine was extracted with a saturated solution of potassium sulfate. The calcine and liquid were separated by filtration. The filtrate was an aqueous solution of potassium sulfate and magnesium sulfate which could be readily separated by known techniques. The recovered potassium sulfate was saved for extraction of further amounts of calcined polyhalite. The solid cake obtained after filtration was almost entirely syngenite and was heated with silica as in Example 2 to convert the calcium sulfate to calcium silicate which was easily separated from the potassium sulfate, by simple filtration.

In the above examples the potassium values in various sulfate ores have been quantitatively recovered as sulfate. For certain crops such as tobacco and citrus fruits, potassium sulfate is a preferred fertilizer constituent. For other uses, the potassium sulfate may be readily converted to other potassium compounds by methods well known in the art.

While silica has been given by way of example, it is to be understood that other acidic oxides such as titania, ferric oxide, alumina, or zirconia may be employed to convert the metal other than alkali metal content of the complex sulfates to relatively insoluble titanates, ferrites, aluminates, zironates or the like. Accordingly the term "acidic oxide" as employed in the following claims is to be construed as including these and other oxides which form relatively insoluble compounds with calcium, magnesium, copper, manganese and aluminum.

Furthermore, although several treatments have been specifically disclosed for a complex potassium sulfate, the process is equally applicable to complex sodium sulfates or complex mixed sodium-potassium sulfates, in order to separate the alkali metal content from the other metal content.

I claim:

1. A process for separating and recovering the alkali metal sulfate content of a sulfate mineral consisting of at least one alkali metal sulfate from the group consisting of sodium sulfate and potassium sulfate and at least one other sulfate from the group consisting of the sulfates of calcium, magnesium, aluminum, copper, lead and manganese which comprises: freeing the sulfate mineral from any chloride associated therewith by rapidly washing the sulfate mineral with cold water; forming an intimate mixture of the washed sulfate mineral and at least one solid oxide selected from the group consisting of silica, titania, zirconia, alumina, and iron oxide, which oxides form relatively insoluble compounds with the oxides of the metals of the second group enumerated above; maintaining the mixture at a temperature between about 500° C. and 1500° C. for a time sufficient to effect conversion of a substantial portion of the sulfate mineral to the relatively insoluble compound of the added oxide; leaching the reaction mixture with water at about 100° C. to extract the alkali metal sulfate from the insoluble reaction product; cooling the aqueous extraction liquor sufficiently to crystallize the alkali metal sulfate therefrom and recovering the said sulfate.

2. A process for separating and recovering the alkali metal sulfate content of a sulfate mineral consisting of at least one alkali metal sulfate and at least one other sulfate from the group consisting of the sulfates of calcium, magnesium, aluminum, copper, lead and manganese which comprises: freeing the sulfate mineral from any chloride associated therewith by rapidly washing the sulfate mineral with cold water; forming an intimate mixture of the washed sulfate mineral and at least one solid oxide selected from the group of oxides consisting of silica, titania, zirconia, alumina and iron oxide, melting the mixture; maintaining the mixture in molten form for a time sufficient to effect conversion of a portion of the sulfate mineral to a relatively insoluble compound of the added oxide; quenching the melt in an aqueous medium; wet grinding the frit so produced; leaching the ground frit with water at about 100° C. to extract the alkali metal sulfate from the ground frit; cooling the aqueous extraction liquor sufficiently to crystallize the alkali metal sulfate therefrom and recovering the said sulfate.

3. A process for separating and recovering the alkali metal sulfate content of a sulfate mineral consisting of at least one alkali metal sulfate and at least one other sulfate from the group consisting of the sulfates of calcium, magnesium, aluminum, copper, lead and manganese which comprises: freeing the sulfate mineral from any chloride associated therewith by rapidly washing the sulfate mineral with cold water; forming an intimate mixture of the washed sulfate mineral and at least one solid oxide selected from the group of oxides consisting of silica, titania, zirconia, alumina and iron oxide, maintaining the mixture at a sintering temperature for a time sufficient to effect conversion of a portion of the sulfate mineral to a relatively insoluble compound of the added oxide; cooling the resulting sinter; leaching the cooled sinter with water at about 100° C. to extract the alkali metal sulfate from the insoluble reaction product; cooling the aqueous extraction liquor sufficiently to crystallize the alkali metal sulfate therefrom and recovering the said sulfate.

4. A process for separating and recovering the alkali metal sulfate content of a sulfate mineral consisting of at least one alkali metal sulfate and at least one alkaline earth metal sulfate which comprises: freeing the sulfate mineral from any chloride associated therewith by rapidly washing the sulfate mineral with cold water; forming an intimate mixture of the washed sulfate mineral and at least one solid oxide selected from the group of oxides consisting of silica, titania, zirconia, alumina and iron oxide, each of which forms relatively insoluble compounds with the oxides of the alkaline earth metals present in the sulfate mineral; maintaining the mixture at a temperature between about 500° C. and 1500° C. for a time sufficient to effect conversion of at least some of the alkaline earth sulfate portion of the sulfate mineral to the relatively insoluble compound of the added oxide; leaching the reaction mixture with water at about 100° C. to extract the alkali metal sulfate from the insoluble reaction product; cooling the aqueous extraction liquor sufficiently to crystallize the alkali metal sulfate therefrom and recovering the said sulfate.

5. A process for separating and recovering the potassium sulfate content of a sulfate mineral consisting of potassium sulfate and at least one alkaline earth metal sulfate which comprises: freeing the sulfate mineral from any chloride associated therewith by rapidly washing the sulfate mineral with cold water; forming an intimate mixture of the washed sulfate mineral and at least one solid oxide selected from the group of oxides consisting of silica, titania, zirconia, alumina, and iron oxide, all of which form relatively insoluble compounds with the oxides of the alkaline earths present in the mineral; maintaining the mixture at a temperature between about 500° C. and 1500° C. for a time sufficient to effect conversion of at least some of the alkaline earth portion of the sulfate mineral to the relatively insoluble compound of the added oxide; leaching the reaction mixture with water at about 100° C. to extract the potassium sulfate from the insoluble reaction product; cooling the aqueous extraction liquor sufficiently to crystallize the potassium sulfate and recovering the said sulfate.

6. A process for separating and recovering the alkali metal sulfate content of a sulfate mineral consisting of at least one alkali metal sulfate from the group consisting of sodium sulfate and potassium sulfate and at least one alkaline earth sulfate which comprises: freeing the sulfate mineral from any chloride associated therewith by rapidly washing the sulfate mineral with cold water; forming an intimate mixture of the washed sulfate mineral and silica; maintaining the mixture at a temperature between about 500° C. and 1500° C. for a time sufficient to effect conversion of at least some of the alkaline earth portion of the sulfate mineral to a relatively insoluble silicate; leaching the reaction mixture with water at about 100° C. to extract the alkali metal sulfate from the insoluble silicate reaction product; cooling the aqueous extraction liquor sufficiently to crystallize the alkali metal sulfate therefrom and recovering the said sulfate.

7. A process for separating and recovering the potassium sulfate content of a polyhalite ore which comprises: freeing the ore from any chloride associated therewith by rapidly washing the ore with cold water; forming an intimate mixture of the washed ore and at least one solid oxide selected from the group of oxides consisting of silica, titania, zirconia, alumina and iron oxide, which form relatively insoluble compounds with the oxides of the calcium and magnesium; maintaining the mixture at a temperature between about 500° C. and 1500° C. for a time sufficient to effect conversion of at least the magnesium sulfate portion of the polyhalite ore to the relatively insoluble compound of the added oxide; leaching the reaction mixture with water at about 100° C. to extract the potassium sulfate from the insoluble reaction product; cooling the aqueous extraction liquor sufficiently to crystallize the potassium sulfate therefrom and recovering the said sulfate.

8. A process for separating and recovering the potassium sulfate content of a polyhalite ore which comprises: freeing the polyhalite ore from any chloride associated therewith by rapidly washing the ore with cold water; forming an intimate mixture of the washed polyhalite ore and at least one solid oxide selected from the group of oxides consisting of silica, titania, zirconia, alumina and iron oxide, which form relatively insoluble compounds with the oxides of calcium and magnesium; maintaining the mixture at a temperature between about 500° C. and 1500° C. for a time sufficient to effect conversion of at least some of the alkaline earth portion of the polyhalite to the relatively insoluble compound of the added oxide; leaching the reaction mixture with water at about 100° C. to extract the potassium sulfate from the insoluble reaction product; cooling the aqueous extraction liquor sufficiently to crystallize the potassium sulfate therefrom and recovering the said sulfate.

9. A process for separating and recovering the constituents of a polyhalite ore which comprises: washing the ore rapidly to remove the major portion of any sodium chloride therein, calcining the washed polyhalite, extracting the calcine with cold water to form a slurry, filtering the slurry to separate the slurry into a magnesium sulfate containing filtrate and a complex potassium-alkaline earth sulfate solid residue, recovering the magnesium sulfate from the filtrate by crystallization, forming an intimate mixture of the solid sulfate residue with silica, heating the mixture to a temperature between about 500° C. and 1500° C. to effect conversion of the alkaline earth sulfate to alkaline earth silicate, extracting the reaction product with water at about 100° C., cooling the extraction liquor to precipitate potassium sulfate and recovering the extracted solid residue consisting essentially of alkaline earth silicate material.

10. A process for separating and recovering the constituents of a polyhalite ore which comprises: washing the ore rapidly to remove the major portion of any sodium chloride therein, calcining the washed polyhalite, extracting the calcine with water at about 100° C. to form a slurry, filtering the slurry to separate the slurry into a magnesium sulfate containing filtrate and a complex potassium-alkaline earth sulfate solid residue, recovering the magnesium sulfate from the filtrate by crystallization, forming an intimate mixture of the solid sulfate residue with silica, heating the mixture to a temperature between about 500° C. and 1500° C. to effect conversion of the alkaline earth sulfate to alkaline earth silicate, extracting the reaction product with water at about 100° C., cooling the extraction liquor to precipitate potassium sulfate and recovering the extracted solid residue consisting essentially of alkaline earth silicate material.

References Cited in the file of this patent
UNITED STATES PATENTS

| | | |
|---|---|---|
| 298,256 | Townsend | May 6, 1884 |
| 1,589,519 | Dolbear | June 22, 1926 |
| 1,794,551 | Schoch | Mar. 3, 1931 |
| 1,794,553 | Schoch | Mar. 3, 1931 |

OTHER REFERENCES

Lange: "Handbook of Chemistry," 8th edition, Handbook Publishers, Inc., Sandusky, Ohio, 1952, pages 250–251 and 276–277.

Storch: Industrial and Engineering Chemistry, vol. 22, No. 9, September 1930, pp. 934–941.

Mellor: "Comprehensive Treatise on Inorganic and Theoretical Chemistry," Longmans, Green and Co., New York, 1923, vol. 2, pp. 657 to 660.